United States Patent [19]

Braconnier

[11] Patent Number: 5,069,464
[45] Date of Patent: Dec. 3, 1991

[54] ENGINE COMPONENT ORGANIZER
[75] Inventor: Ed Braconnier, Surrey, Canada
[73] Assignee: Gilbert Wan, Vancouver, Canada
[21] Appl. No.: 441,519
[22] Filed: Nov. 27, 1989
[51] Int. Cl.⁵ .................................................. B62B 3/10
[52] U.S. Cl. ................................ 280/47.35; 280/79.11
[58] Field of Search .................. 280/32.5, 32.6, 47.34, 280/47.35, 79.11, 79.3, 79.7

[56] References Cited
U.S. PATENT DOCUMENTS

| | | | |
|---|---|---|---|
| 3,894,748 | 7/1975 | Ratcliff | 280/47.35 |
| 4,466,628 | 8/1984 | Zerver | 280/47.35 |
| 4,743,040 | 5/1988 | Breveglieri et al. | 280/47.35 |

Primary Examiner—Andres Kashnikow
Assistant Examiner—Richard Camby
Attorney, Agent, or Firm—Shlesinger, Arkwright & Garvey

[57] ABSTRACT

An engine component organizer which includes a wheeled cart having a plurality of trays for supporting relatively bulky and heavy engine parts. An extension is attached to the tray having a plurality of receptacles and protrusions for storing relatively small parts of an engine in a way that associates parts with a corresponding location in the engine. Holders are affixed to sides of the cart for supporting elongated relatively heavy parts of an engine.

8 Claims, 4 Drawing Sheets

ENGINE COMPONENT ORGANIZER

BACKGROUND OF THE INVENTION

The present invention relates to an engine component organizer for storing engine parts from a disassembled engine and allowing them to be easily moved to various work stations.

Current practice in engine repair work is to utilize cardboard boxes with punched holes in the bottom to store engine parts. The time taken to cut out and mark each storage location can be a significant portion of the total engine repair time. Not only is it time consuming to punch the boxes with holes but such a technique offers no coordinated way to move the disassembled engine parts from one work station to the next for cleaning an various types of repair operations. In addition, the boxes deteriorate due to their contact with wet engine parts and often the association with their position on the engine is lost. In modern high performance engines installation of a part in a position different from its original position in the engine can and often does result in rapid degradation and subsequent failure of the engine. Finally, there is a large amount of storage space required to store engine parts in such a manner often on benches where space is at a premium. Thus, there has been a long standing need for an organized way of storing and moving from one work station to another engine parts from a disassembled engine.

Accordingly, it is an object of the present invention to provide an engine component organizer for systematically storing engine parts.

It is a further object of the invention to provide an engine component organizer for storing internal and external engine parts which also allows them to be moved without first removing them from their stored positions on the organizer.

SUMMARY OF THE INVENTION

According to the invention there is provided an engine component organizer which includes a wheeled cart, a top tray affixed to the cart, and a platform extension attached to the top tray. The extension has a left and right set of valve receptacles, left and right sets of push rod receptacles, left and right sets of hydraulic lifter receptacles, and left and right sets of conical projections. Each valve part can be identified as having been previously used on a particular location on the engine merely from the position on the organizer 11 in which it is stored.

The platform extension may include left and right sets of valve receptacles, left and right sets of push rod receptacles, left and right sets of hydraulic lifter receptacles, and left and right sets of conical projections. Each of the left sets corresponding to parts from a left engine head and the right sets corresponding to parts from a right engine head.

The organizer may include left and right sets of rod portions for hanging pistons associated with the left and right cylinder heads.

Advantageously, left and right elongated horizontally disposed lips extend out from each side of the cart for supporting left and right cylinder heads, respectively.

A pair of spaced apart elongated horizontally disposed troughs may be affixed to the cart.

Preferably the organizer includes middle and bottom trays affixed to the cart and the top tray has a work surface forming a substantial portion thereof.

The platform extension left and right sets of valve receptacles, push rod receptacles, hydraulic lifter receptacles, and conical projections may each be in the form of rows.

BRIEF DESCRIPTION OF THE DRAWINGS

The novel features believed characteristic of the invention are set forth in the appended claims. The invention itself, however, as well as other features and advantages thereof, will be best understood by reference to the description which follows read in conjunction with the accompanying drawings wherein:

DETAILED DESCRIPTION WITH REFERENCE TO THE DRAWINGS

Figure 1:
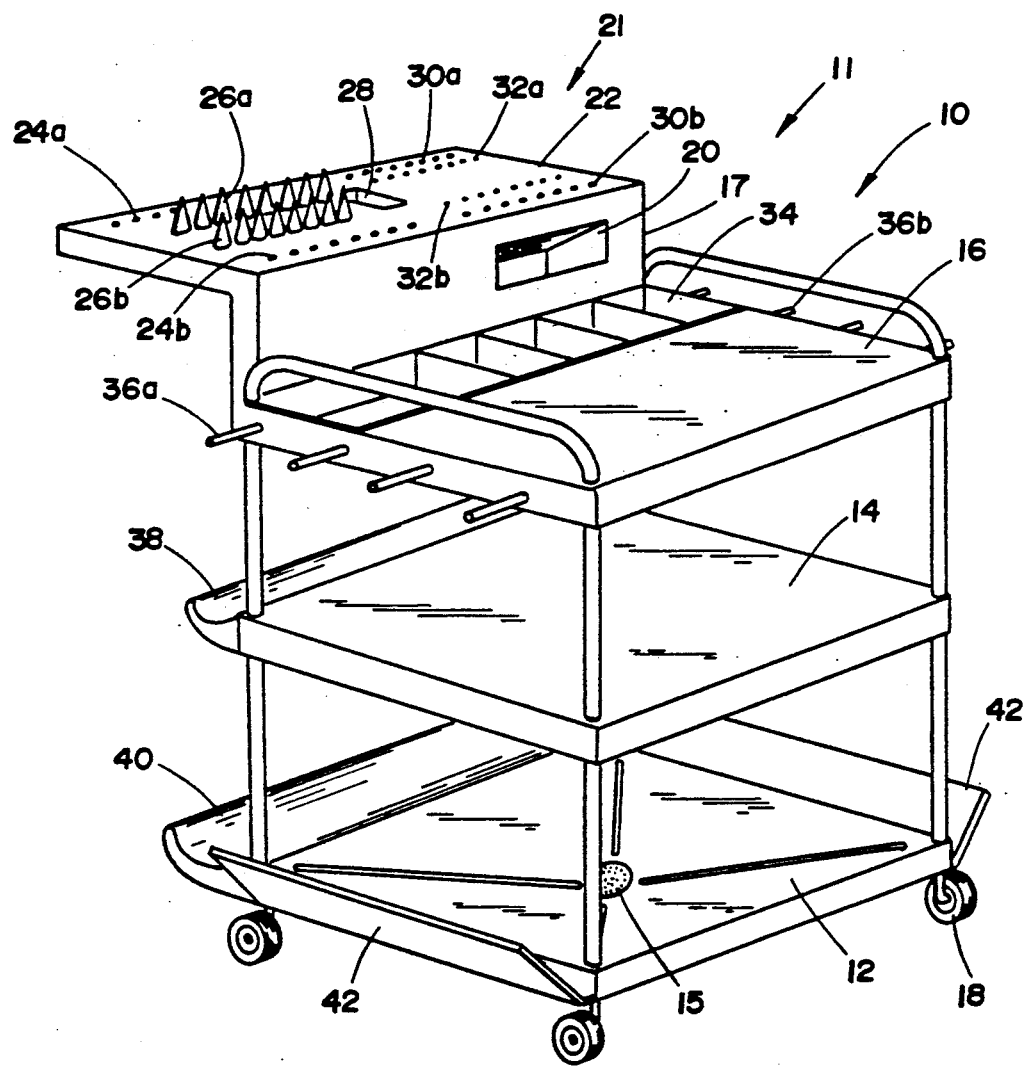
FIG. 1 is a perspective view of the organizer.
Figure 2:
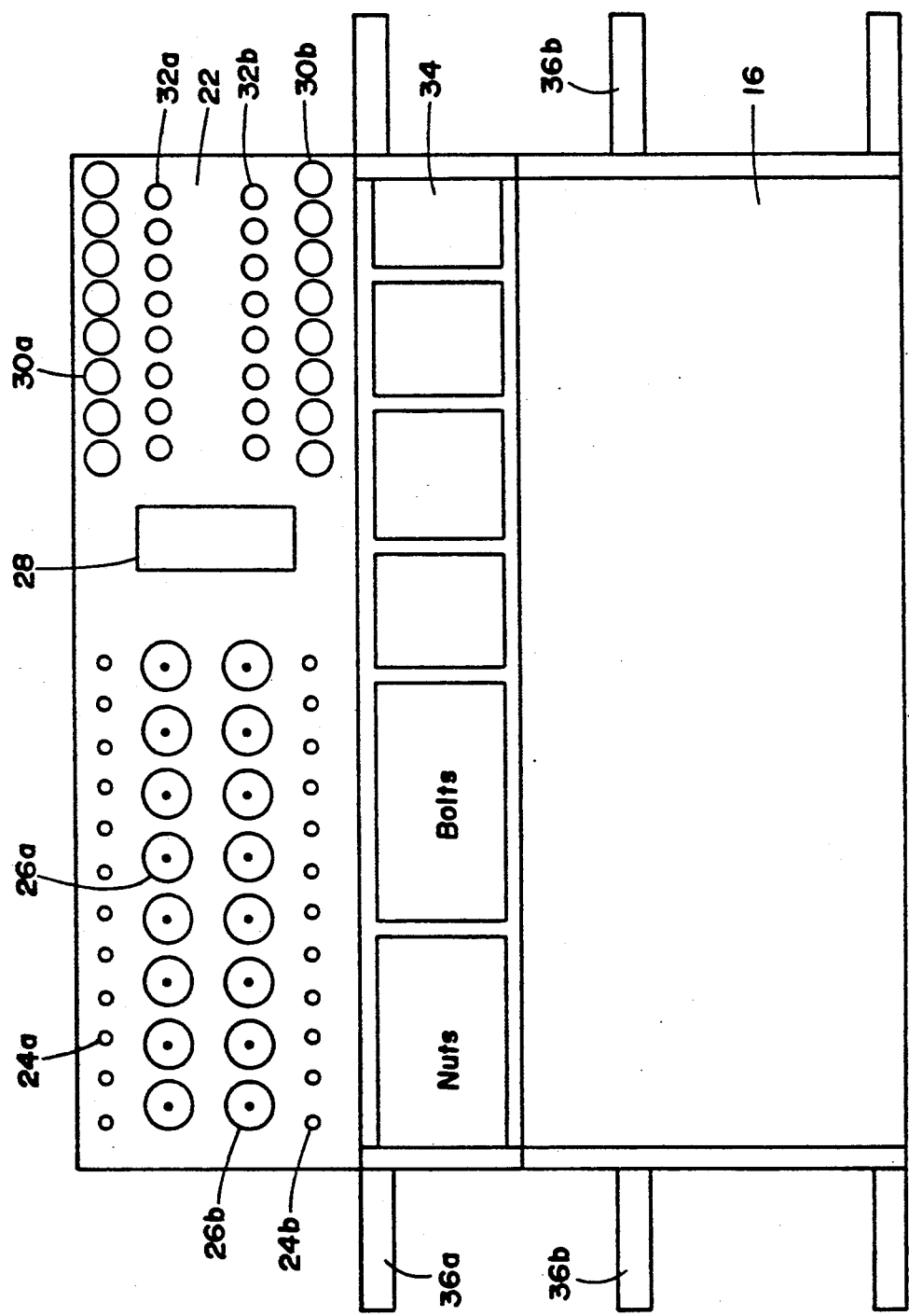
FIG. 2 is a plan view of the organizer.
Figure 3:
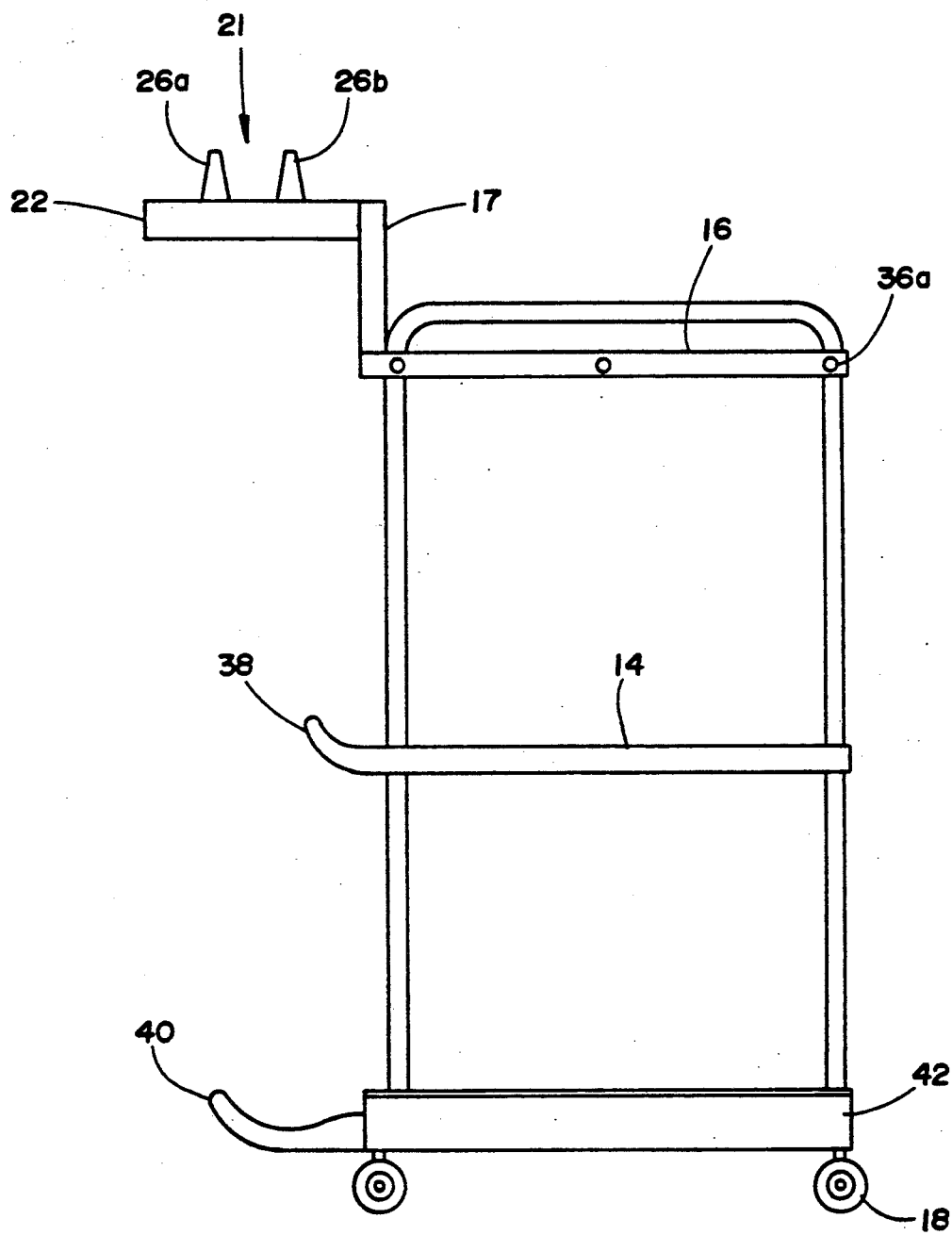
FIG. 3 is a side elevation view of the organizer.

Referring to FIGS. 1 to 3, there is shown the engine organizer 11 consisting of a wheeled cart 10 supported by four casters 18 having bottom, middle and top trays 12, 14 and 16, respectively. A plurality of recessed receptacles 34 along one side of the top tray 16 are used to store various small parts such as nuts and bolts. Rod portions 36a and 36b project out from the edges of top tray 16 both on the left and right sides, respectively, of cart 10.

Left 24a and right 24b sets of valve receptacles, left 32a and right 32b push rod receptacles, and left 30a and right 30b hydraulic lifter receptacles are each formed in a row in platform 22. Left 26a and right 26b rows of conical projections are formed on the top surface of platform 22 intermediate sets of valve receptacles 24a and 24b. A rectangular valve keeper receptacle 28 is formed in the center of platform 22.

A slot 20 in vertical section 17 is inclined from the horizontal downwardly from the front face of section 17.

Troughs 38 and 40 are formed along the rear side of cart 10 along the rear edge of bottom tray 12 and middle tray 14, respectively. Elongated lips 42 extend upwardly and outwardly from side edges of bottom tray 12. Small drain holes 15 are provided centrally in bottom tray 12.

Figure 4:
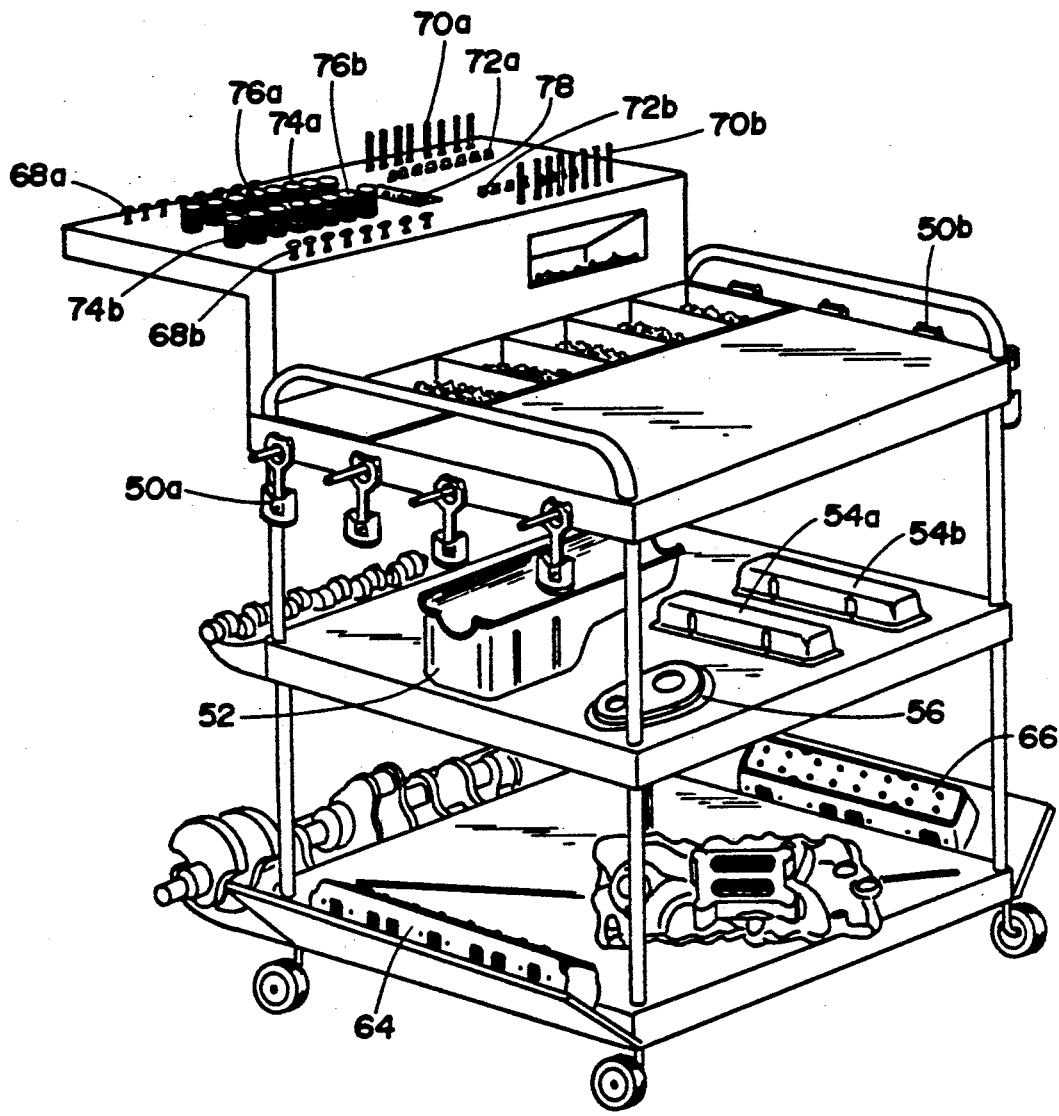
FIG. 4 is a perspective view of the organizer of Figure with engine parts stored thereon.

Referring to FIG. 4, the location of stored engine parts includes valve related parts stored on platform 22, and other parts stored elsewhere or cart 10.

Top tray 16 is available as a work surface for disassembly and cleaning.

Valves 68a corresponding to the left head 64 are stored in valve receptacles 24a while those 68b corresponding to the right head 66 are stored in valve receptacles 24b. Similarly, hydraulic valve lifters 70a corresponding to the left head 64 are stored in valve lifter receptacles 30a while those 70b corresponding to the right head 66 are stored in valve lifter receptacles 30b. Push rods 72a and 72b are stored in push rod receptacles 32a and 32b, respectively. Valve springs 74a and 74b and valve spring retainers 76a and 76b are stored on conical projections 26a and 26b, respectively. Valve keepers 78 are kept in receptacle 28.

In each row of receptacles 24a, 24b, 30a, 30b, 32a, 32b and projections 26a and 26b there is a one to one correspondence between parts and associated locations in each cylinder head. For example, in the first position of row 24a there is placed the intake valve and in the second position the exhaust valve for the first cylinder position of the left head 64. On the first two projections of conical projections 26a there are stored a valve spring and retainer spring for the first intake and exhaust valves of the first cylinder position of left head 64. Thus, it is possible to store all of the valve parts on platform 22 in a way which allows them to be reassembled in their original locations without marking the storage positions.

Similarly, the pistons 50a for the left head 64 are stored on the rod portions 36a on the left side of cart 10 and those 50b for the right head 66 are stored on rod portions 36b on the right side of cart 10.

Bottom tray 12 accommodates manifolds, carburetors, distributors, and other relatively heavy pieces. Middle tray 14 holds oil pan 52, valve covers 54a and 54b corresponding to heads 64 and 66, respectively, timing chain cover 56, and other lighter elements such as belts, hoses, air cleaner and similar items.

With a motor disassembled and stored on the organizer 11 it is possible to wheel the entire motor excluding engine block to any desired location. The entire assembly can then be moved to a new work station for further repair work.

It will be appreciated that all of the valve assembly parts are stored together on platform 22 in a relationship that is comparable to their position on an engine. For example, valves 68a and 68b are stored in a row in separate banks of eight and a similar arrangement is provided for valve lifters 30a and 30b. Valve springs 74a and 74b and valve spring retainers 76a and 76b are stored on left 26a and right 26b conical projections.

While the organizer 11 in FIG. 1 is shown for use with a motor with a maximum of 8 cylinders, clearly it can be expanded to accommodate more. Moreover, the same organizer 22 can be used or transmission and differential overhauls, brake repairs, carburetor overhauls an other kinds of repairs, although it is most conveniently applied to engine disassembly. The organizer 11 thus saves space and work time and minimizes the likelihood of losing crucial parts or the wrong positioning of parts.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modification or embodiments as fall within the true scope of the invention.

I claim:

1. An engine component organizer, comprising:
   a wheeled cart;
   a top tray affixed to said cart; and
   a platform attached to said top tray and extending laterally therefrom including left and right sets of valve receptacles, left and right sets of push rod receptacles, left and right sets of hydraulic lifter receptacles, and left and right sets of conical projections, each of said left sets corresponding to parts from a left engine head and said right sets corresponding to parts from a right engine head.

2. An organizer according to claim 1, wherein said organizer includes left and right sets of rod portions for hanging pistons associated with said left and right cylinder heads.

3. An organizer according to claim 2, wherein said organizer includes left and right elongated horizontally disposed lips extending out from each side of said cart for supporting left and right cylinder heads, respectively.

4. An organizer according to claim 3, wherein said organizer includes a pair of spaced apart elongated horizontally disposed troughs affixed to said cart.

5. An organizer according to claim 4, wherein said organizer includes middle and bottom trays affixed to said cart and said top tray has a work surface forming a substantial portion thereof.

6. An engine component organizer, comprising:
   a wheeled cart;
   a top tray affixed to said cart;
   a platform extension attached to said top tray having left and right sets of valve receptacles, left and right sets of push rod receptacles, left and right sets of hydraulic lifter receptacles, and left and right sets of conical projections, each of said left sets corresponding to parts from a left engine head and said right sets corresponding to parts from a right engine head;
   left and right sets of rod portions affixed to left and right hand sides of said cart for hanging pistons associated with said left and right cylinder heads; and
   left and right elongated horizontally disposed lips extending out from each side of said cart for supporting left and right cylinder heads, respectively.

7. An organizer according to claim 6, wherein said organizer includes a pair of spaced apart elongated horizontally disposed troughs affixed to said cart.

8. An organizer according to claim 7, wherein said organizer includes middle and bottom trays affixed to said cart and said top tray has a work surface forming a substantial portion thereof.

* * * * *